United States Patent
Waters et al.

(10) Patent No.: US 8,054,914 B2
(45) Date of Patent: Nov. 8, 2011

(54) NOISE VARIANCE ESTIMATION

(75) Inventors: Deric W. Waters, Dallas, TX (US);
Anuj Batra, Dallas, TX (US); Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 769 days.

(21) Appl. No.: 12/022,461

(22) Filed: Jan. 30, 2008

(65) Prior Publication Data
US 2008/0181323 A1    Jul. 31, 2008

Related U.S. Application Data

(60) Provisional application No. 60/887,246, filed on Jan. 30, 2007.

(51) Int. Cl.
*H03K 9/00* (2006.01)
*H04L 27/00* (2006.01)

(52) U.S. Cl. ........................................................ 375/316

(58) Field of Classification Search .................. 375/140, 375/141, 148, 260, 267, 295, 316, 329, 340, 375/341, 345, 346, 347, 350; 455/83, 63.1, 455/67.11, 115.1, 222, 278.1, 452.1
See application file for complete search history.

(56) References Cited

U.S. PATENT DOCUMENTS

| | | | |
|---|---|---|---|
| 7,599,663 B1 * | 10/2009 | Narasimhan | 455/67.11 |
| 2003/0210749 A1 * | 11/2003 | Asjadi | 375/260 |
| 2004/0028154 A1 * | 2/2004 | Yellin et al. | 375/341 |
| 2004/0171366 A1 * | 9/2004 | Bar-Ness et al. | 455/278.1 |
| 2004/0203397 A1 * | 10/2004 | Yoon et al. | 455/63.1 |
| 2005/0111528 A1 * | 5/2005 | Fulghum et al. | 375/148 |
| 2005/0259721 A1 * | 11/2005 | Kawamoto et al. | 375/144 |
| 2006/0062322 A1 * | 3/2006 | Namgoong et al. | 375/285 |
| 2007/0014375 A1 * | 1/2007 | Nakao | 375/260 |
| 2007/0053452 A1 * | 3/2007 | Koo et al. | 375/260 |
| 2007/0242768 A1 * | 10/2007 | Wallace et al. | 375/260 |
| 2007/0243837 A1 * | 10/2007 | Krishnamoorthi et al. | 455/115.1 |

* cited by examiner

*Primary Examiner* — David C. Payne
*Assistant Examiner* — Syed Haider
(74) *Attorney, Agent, or Firm* — Steven A. Shaw; W. James Brady; Frederick J. Telecky, Jr.

(57) ABSTRACT

A method and system for estimating noise variance. A method for noise variance estimation comprises receiving a first multi-sample symbol and receiving a second multi-sample symbol. The first multi-sample symbol is subtracted from the second multi-sample symbol to produce a set of noise samples. The set of noise samples is used to produce a noise variance estimate. The noise variance estimate is applied in various tasks (e.g. channel estimation, log-likelihood ratio computation, and/or minimum mean squared error equalization) to process data provided to a user.

23 Claims, 4 Drawing Sheets

NOISE VARIANCE ESTIMATION

CROSS-REFERENCE TO RELATED APPLICATIONS

The present application claims priority to U.S. provisional patent application Ser. No. 60/887,246, filed Jan. 30, 2007, and entitled "Noise Variance Estimation" hereby incorporated herein by reference.

BACKGROUND

Wireless communications systems have become a ubiquitous feature of modern society. Wireless system performance is affected by various conditions that distort or interfere with the wireless signals. Additive noise, which may be induced by the system components themselves or by external noise sources, is one factor affecting the quality of received signals in a wireless system. Noise variance is a measure of the statistical dispersion of the noise magnitude of a received signal. In communication systems, the receiver processing may require an estimation of the noise variance for a variety of reasons. For example, minimum mean-squared error ("MMSE") equalization and log-likelihood ratio ("LLR") computation use the noise variance. Channel estimation may also be improved if the noise variance is known prior to computation of the channel estimate. Accordingly, estimation of the noise variance of a received signal without knowledge of the channel is desirable.

SUMMARY

A variety of novel techniques for estimating noise variance are herein disclosed. The techniques allow for noise variance estimates with no knowledge of the channel. In accordance with at least some embodiments, a method includes receiving a first multi-sample symbol and receiving a second multi-sample symbol. The first multi-sample symbol is subtracted from the second multi-sample symbol to produce a set of noise samples. The set of noise samples resulting from the subtraction is used to estimate a noise variance. The estimated noise variance is applied to process data provided to a user.

In other embodiments, a receiver includes a noise variance estimator and a noise sample generator. The noise sample generator extracts a first multi-sample symbol and a second multi-sample symbol from a received packet. The noise sample generator subtracts the first multi-sample symbol from the second multi-sample symbol to produce a set of noise samples. The noise variance estimator estimates a noise variance from the set of noise samples.

In yet other embodiments, system includes a transmitter and a receiver. The transmitter transmits a packet comprising at least two multi-sample symbols. The receiver receives the transmitted packet. The receiver comprises a noise variance estimator and a noise sample generator. The noise sample generator extracts the at least two symbols from the received packet, and subtracts one symbol from the other to produce a set of noise samples. The noise variance estimator uses the set of noise samples to estimate a noise variance.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . . ". The term "couple" or "couples" is intended to mean either an indirect or direct connection. Thus, if a first component couples to a second component, that connection may be through a direct connection, or through an indirect connection via other components and connections. The term "system" refers to a collection of two or more hardware and/or software components, and may be used to refer to an electronic device or devices, or a subsystem thereof. Further, the term "software" includes any executable code capable of running on a processor, regardless of the media used to store the software. Thus, code stored in non-volatile memory, and sometimes referred to as "embedded firmware," is included within the definition of software.

BRIEF DESCRIPTION OF THE DRAWINGS

In the following detailed description, reference will be made to the accompanying drawings, in which.

The drawings show illustrative embodiments that will be described in detail. However, the description and accompanying drawings are not intended to limit the claimed invention to the illustrative embodiments, but to the contrary, the intention is to disclose and protect all modifications, equivalents, and alternatives falling within the spirit and scope of the appended claims.

DETAILED DESCRIPTION

Disclosed herein are various systems and methods for performing noise variance estimation in a wireless receiver. Embodiments of the present disclosure perform noise variance estimation prior to channel estimation and/or with no knowledge of the channel transfer function.

Figure 1:
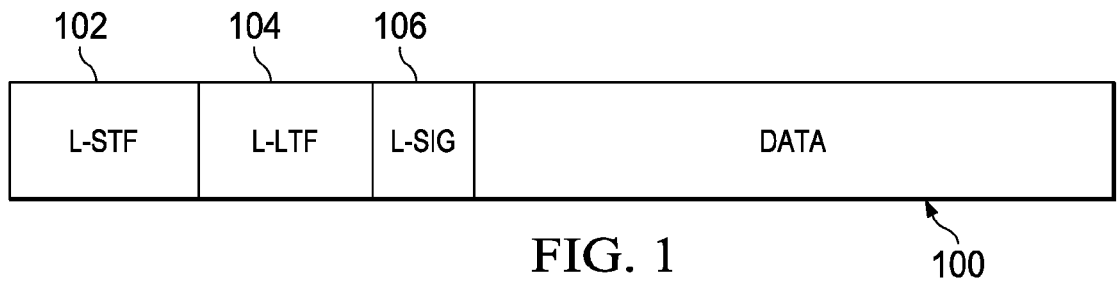
FIG. 1 shows an illustrative IEEE 802.11a/g packet structure in accordance with embodiments of the invention.

FIG. 1 shows the preamble structure for an IEEE 802.11a/g signal 100. The preamble begins with a legacy short training field ("L-STF") 102 comprising ten short training symbols. A legacy long training field ("L-LTF") 104 follows the L-STF 102. The L-LTF comprises an extended cyclic prefix followed by two consecutive related long training symbols. An extended cyclic prefix allows two consecutive symbols to be transmitted without a guard interval to separate them. If the transmitted signal is divided into four partitions [A B C D], then the conventional cyclic prefix is [D], so that the transmitted symbol is [D A B C D]. Similarly, with an extended cyclic prefix the two transmitted symbols could be represented as [C D A B C D A B C D], where the extended cyclic prefix is [C D]. A legacy signal field ("L-SIG") 106 provides rate information indicating the modulation and coding rate used in the remainder of the packet, and length information indicating the number of octets transmitted.

Figure 2:
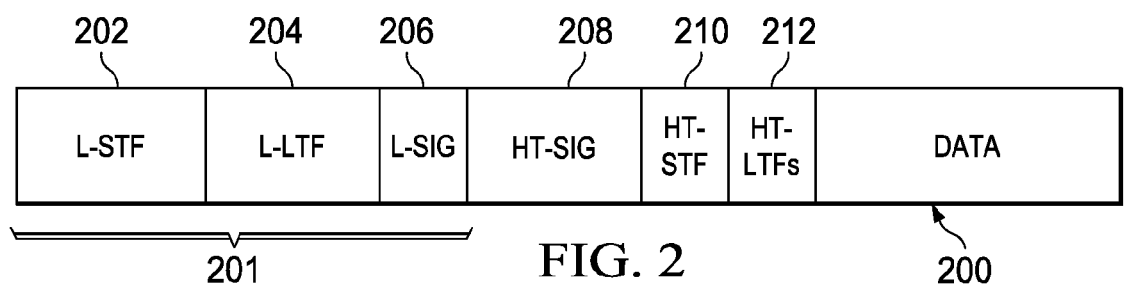
FIG. 2 shows an illustrative IEEE 802.11n mixed-mode packet structure in accordance with embodiments of the invention.

FIG. 2 shows the preamble structure for an 802.11n mixed-mode signal 200. Mixed-mode allows the Multiple-Input Multiple-Output ("MIMO") Orthogonal Frequency Division Multiplexed ("OFDM") systems of IEEE 802.11n to co-exist with legacy IEEE 802.11a/g OFDM systems. A legacy preamble 201 comprises an L-STF field 202, an L-LTF field 204, and an L-SIG field 206, each as described above in regard to the IEEE 802.11a/g preamble of FIG. 1.

The L-SIG field 206 is followed by a series of high-throughput fields. The high-throughput signal field (HT-SIG) 208 comprises rate and length information. A high-throughput short training field ("HT-STF") 210 follows the HT-SIG 208 field. The HT-STF field is included to improve Automatic Gain Control ("AGC") training in conditions where the received signal power differs before and after the HT-STF. One or more high-throughput long training fields ("HT-LTF") 212 follow the HT-STF. The HT-LTFs 212 provide a means for estimation of the channel response for each spatial stream.

Figure 3:
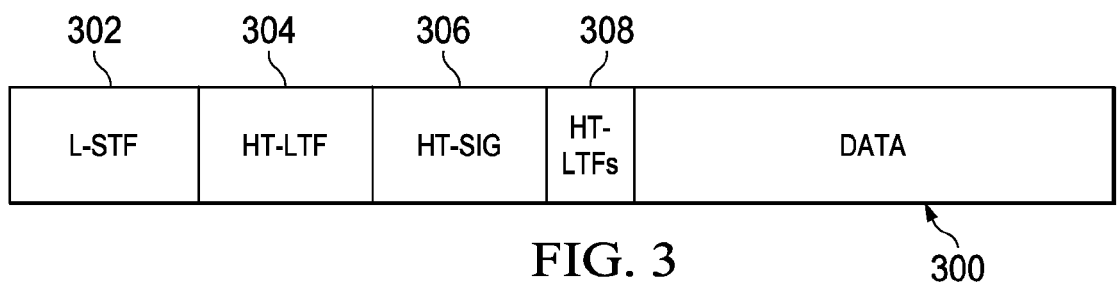
FIG. 3 shows an illustrative IEEE 802.11n Green-Field packet structure in accordance with embodiments of the invention.

FIG. 3 shows the preamble structure for an 802.11n Green-Field signal 300. The Green-Field signal is not compatible with legacy IEEE 802.11 systems, such as 802.11a/g. The preamble is shortened by deleting unnecessary legacy compatibility fields, thus reducing preamble overhead. The Green-Field preamble comprises an L-STF field 302 identical to the L-STF field 102. The L-STF 302 is followed by a first HT-LTF field 304 comprising an extended cyclic prefix followed by two consecutive related long training symbols. These two long training symbols are related in that they are cyclic shifts of each other. An HT-SIG field 306 identical to the HT-SIG 206 described above follows the first HT-LTF 304. In some cases, one or more HT-LTF fields 308 similar to the HT-LTF 212 described above follow the HT-SIG field 306.

Each of the three packet types 100, 200, 300 described above includes two consecutive related long training field ("LTF") symbols near the beginning of the packet. Legacy packet 100 and Mixed-Mode packet 200 include legacy long training field ("L-LTF") symbols, while Green-Field packet 300 includes high-throughput long training field ("HT-LTF") symbols. L-LTF and HT-LTF symbols differ in that HT-LTF symbols employ additional sub-carriers.

The first two LTF symbols transmitted in the preamble can be processed in accordance with the known relationship between the two symbols to obtain two symbols as they would appear if they were identical at the transmitter. The two symbols may be related, for example, by cyclic shifts or phase shifts. Two symbols containing N samples each are cyclic shifts of each other if the samples [1, 2, ..., N] of one symbol can be cyclically shifted such that they are identical to samples [i, i+1, ... N, 1, 2, ... i−1] of the other symbol. At the receiver, this relationship can be removed by cyclically shifting one or both symbols. Alternatively, this cyclically shifted relationship can be removed in the frequency domain after a Fast Fourier Transform ("FFT") by applying the appropriate phase shift to each tone. In a second example of two related symbols, the two symbols are related by a linear phase shift in the time domain. The receiver can remove this relationship in the time domain by applying the opposite linear phase shift. Alternatively, the receiver can remove the linear phase shift by cyclically shifting the tones after an FFT. Embodiments of the invention are not limited to the above examples of how two related symbols can be converted into two identical symbols by processing at the receiver. The process of creating two identical symbols may also include, for example, time, frequency, and/or phase corrections to one or both of the incoming symbols. Accordingly, embodiments of the invention apply to all received signals whereby a known relationship between symbols allows for conversion of the symbols such that the resultant symbols appear as though identical at transmission.

The processing to extract two identical symbols from two related received symbols can occur prior to the noise variance estimator, so that at the input of the noise variance estimator there are two identical symbols. Alternatively, this processing can be incorporated into the noise variance estimator. For example if the two symbols are cyclic shifts of each other, then the noise variance estimator could reverse this relationship by subtracting the two matching samples. For example, if the first symbol contains the four samples [A B C D] plus noise, and the second symbol contains the same four samples in a different order [B C D A] plus noise, then an embodiment of the noise variance estimator would subtract the first sample of the first symbol from the last sample of the second symbol, the second sample of the first symbol from the first sample of the second symbol, etc. to produce noise samples.

The result of subtracting two identical symbols or properly subtracting two related symbols is noise samples. Subtraction of one symbol from the other can be performed in either the time domain or the frequency domain. If the subtraction is performed in the time-domain, then the resulting difference is converted into the frequency domain for further processing. If the subtraction is performed in the frequency domain, then each of the symbols is converted into the frequency domain and a difference is computed for each sub-carrier. Such conversion into the frequency domain is a typical OFDM demodulation, and an FFT, for example, may be used to achieve this conversion. The process of extracting identical symbols from related symbols may be implemented before or after the FFT. The noise samples resulting from the difference of the two symbols can be used to estimate the noise variance.

After OFDM demodulation, or frequency domain transformation (e.g., FFT), has been applied to the received signal, let the received signal on the i-th receive chain on the k-th sub-carrier during the t-th LTF symbol be denoted in the frequency domain as:

$$r_{k,i}(t) = h_{k,i}(t)a_k(t) + n_{k,i}(t)$$

where $h_{k,i}(t)$ represents the channel on the i-th receive chain on the k-th sub-carrier during the t-th LTF symbol, $a_k(t)$ is the transmitted value on the k-th sub-carrier of the t-th LTF symbol, and $n_{k,i}(t)$ is the noise on the i-th receive chain during the t-th LTF symbol on the k-th sub-carrier. The transmitted value $a_k(t)$ depends on t because the two LTF symbols may only be related—not identical $a_k(1) \neq a_k(2)$ and/or $h_{k,i}(1) \neq h_{k,i}(2)$.

If the symbols have been processed prior to entering the noise variance estimator to make them identical, for example by removing a cyclic shift, then noise samples for each sub-carrier are obtained by the subtraction:

$$\hat{n}_{k,i} = r_{k,i}(1) - r_{k,i}(2) \qquad (1)$$
$$= n_{k,i}(1) - n_{k,i}(2) + (h_{k,i}(1) - h_{k,i}(2))a_k.$$

On the other hand, if the two symbols are only related and not identical then extra processing is required during the subtraction. For example, if $h_k(1)=h_{k+p}(2)$ and $a_k(1)=a_k(2)=a_k$ then the noise samples for each sub-carrier are obtained by the subtraction:

$$\hat{n}_{k,i} = r_{k,i}(1) - r_{k+p,i}(2) \quad (2)$$
$$= n_{k,i}(1) - n_{k+p,i}(2) + (h_{k,i}(1) - h_{k+p,i}(2))a_k.$$

In general, embodiments rely on the fact that the channel is changing slowly in time so that $h_{k,i}(1)-h_{k,i}(2) \cong 0$ or $h_{k,i}(1)-h_{k+p,i}(2) \cong 0$ for the two examples (1) and (2) above, respectively. The difference is computed independently on each receive chain using the same procedure, which is represented by either Equation (1) or (2). Alternatively, the noise samples may be computed by subtracting the first symbol from the second symbol.

In Equations (1) and (2), the difference is implemented in the frequency domain. Equations (1) and (2) assume that the OFDM demodulation, or frequency domain transformation (e.g., FFT), has already been applied to the received signal. The received signal on each subcarrier is computed from the time-domain received signal $\tilde{r}_i(t)$ according to:

$$\{r_{k,i}(t)\} = FFT(\tilde{r}_i(t)).$$

If the difference is computed in the time domain, then noise samples are obtained by taking the FFT of the result of the subtraction:

$$\{\hat{n}_{k,i}\} = FFT(\tilde{r}_i(2) - \tilde{r}_i(1)),$$

or according to:

$$\{\hat{n}_{k,i}\} = FFT(\tilde{r}_i(1) - \tilde{r}_i(2)).$$

Again, it is assumed that the two originally related symbols have been made identical via some processing prior to the subtraction.

Embodiments of the invention assume that the noise variance for each receive chain may be different. Embodiments further assume that the noise is white (uncorrelated in time) so that each sub-carrier has the same noise variance. In practice, some tones may be corrupted by extra noise sources, but embodiments aim to estimate only that part of the noise that is common to all subcarriers. In an alternative embodiment, sub-carriers of the received signal are allocated into groups, and the noise variance of each group is estimated. The noise variance of tones from different groups is assumed to be different in this case.

Note that the HT-LTF transmission employs more sub-carriers than does the L-LTF transmission, however, the additional sub-carriers cannot be exploited during noise variance estimation unless the packet type is known. The packet-type can be obtained through packet-type detection techniques such as those disclosed in U.S. Patent Application Publication No. 2007/0253499 A1, filed Dec. 29, 2006, and entitled "Robust Detection of Packet Types" hereby incorporated herein by reference. Alternative embodiments of the invention store the samples from the LTF field and either perform noise variance estimation again, or refine the previous estimates, using the additional sub-carriers after determining the packet-type. Noise variance estimation is performed under the assumption that two L-LTF training symbols have been received. Thus, in an 802.11n system 20 MHz and 40 MHz packets provide up to 52 and 116 samples of the noise for each receive chain, respectively.

Embodiments of the invention compute the noise variance, using noise samples derived using Equation (1), (2) from one or more of the sub-carriers. Some sub-carriers may be contaminated and deemed unfit for use in the noise variance estimation. For example, if a sub-carrier subject to interference is used in the estimation it could cause inaccuracies in the noise variance estimate. Embodiments may employ various methods to identify corrupt sub-carriers. For example, an embodiment may compute a noise variance for each sub-carrier and deem corrupt those sub-carriers whose noise variance deviates from the mean noise variance by more than a predetermined amount.

The subset of sub-carriers used to estimate the noise variance is labeled S. The estimated noise variance for the i-th receive chain is computed according to:

$$\hat{\sigma}_i^2 = \frac{1}{|S|} \sum_{k \in S} \alpha_k \left| \frac{\hat{n}_{k,i}}{\sqrt{2}} \right|^2, \quad (3)$$
$$= \frac{1}{|S|} \sum_{k \in S} \frac{\alpha_k}{2} |\hat{n}_{k,i}|^2,$$
$$= \frac{1}{2|S|} \sum_{k \in S} \alpha_k |\hat{n}_{k,i}|^2,$$

where weighting factors $\{a_k\}$ allow the receiver to bias the estimate towards the sub-carriers it deems more reliable. For simplicity, some embodiments of the invention set the weighting factors to unity for equal weighting:

$$\hat{\sigma}_i^2 = \frac{1}{2|S|} \sum_{k \in S} \alpha_k |\hat{n}_{k,i}|^2 \quad (4)$$

Various embodiments of the invention refine the noise estimate based upon additional noise samples that may be computed from the received signal after the LTF symbols have passed. Possible additional sources of noise samples include pilot tones in any symbol and the SIG symbol 106, 208, or 306. For pilot tones, also sometimes called pilot sub-carriers, the transmitted data is known, so the received signal on the i-th receive chain on the k-th sub-carrier during the t-th symbol may be denoted as:

$$r_{k,i}(t) = h_{k,i}(t)a_k(t) + n_{k,i}(t).$$

Note that in general only a few of all the sub-carriers are pilot sub-carriers, and $a_k(t)$ is known only for the pilot sub-carriers. Embodiments do not rely on consecutive related symbols, but instead, remove the known value $a_k(t)$ from two consecutive symbols. For example, noise samples can be computed according to:

$$\hat{n}_{k,i}(t) = \frac{a_k^*(t)}{|a_k(t)|^2} \cdot r_{k,i}(t) - \frac{a_k^*(t-1)}{|a_k(t-1)|^2} \cdot r_{k,i}(t-1), \quad (5)$$

where $a_k^*(t)$ is the conjugate of $a_k(t)$. The conjugation is only necessary if $a_k(t)$ has an imaginary component. Noise samples can be computed in accordance with Equation (5) for any sub-carriers where $a_k(t)$ and $a_k(t-1)$ are both known. The transmitted values $a_k(t)$ may be known from the definition of the transmission system, or be estimated by the receiver itself. The 802.11 standard provides methods to robustly estimate the values transmitted in the SIG field, so the SIG field can provide additional noise samples for computing or refining the noise variance estimate.

Additional noise samples, where available, can be used refine the noise estimate. For example, if $\hat{\sigma}_i^2(t_1)$ and $\hat{\sigma}_i^2(t_2)$ are noise variance estimates from two different time instants computed according to one of the above methods, then a refined noise variance estimate can be computed as:

$$\hat{\sigma}_i^2(t) = \frac{\beta_1 \hat{\sigma}_i^2(t_1) + \beta_2 \hat{\sigma}_i^2(t_2)}{\beta_1 + \beta_2},$$

where the scalars $\beta_1$ and $\beta_2$ provide means to weight the two noise variance estimates. A practical instance where $\beta_1 \neq \beta_2$ is when there are fewer noise samples at time instant $t_2$ than at time instant $t_1$.

Alternatively, all available noise samples can be combined into a set and the noise variance estimate can be computed directly from the set of noise samples as already described for the set S. This is called a noise-variance revision.

Figure 4:
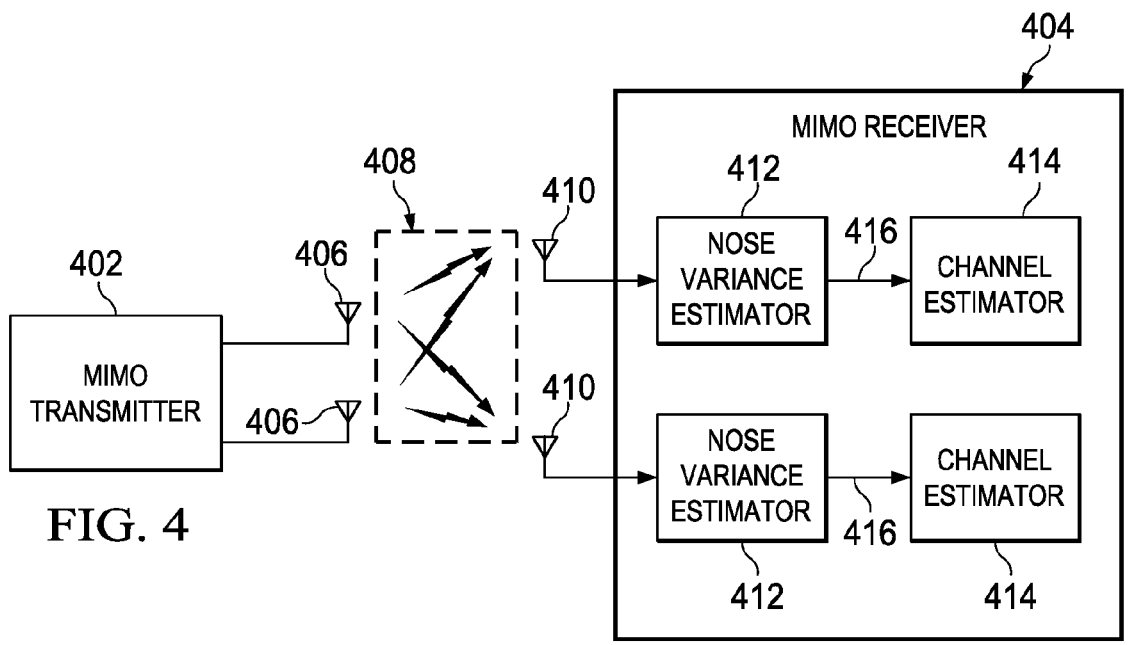
FIG. 4 shows an illustrative wireless network including noise variance estimation in accordance with embodiments of the invention.

FIG. 4 shows an illustrative wireless system including noise variance estimation in accordance with embodiments of the invention. The system of FIG. 4 is a MIMO-OFDM system. Note however that embodiments of the invention encompass all communication systems using a protocol wherein two related symbols are transmitted during a packet preamble. Transmitter 402 includes one or more antennas 406 for transmitting radio frequency signals. Signals transmitted by MIMO-OFDM transmitter 402 are partitioned into multiple sub-signals and transmitted on a plurality of orthogonal sub-carriers or tones. MIMO-OFDM transmitter 402 may, in general, be a fixed or portable wireless device, a cellular phone, a personal digital assistant, a wireless modem card, or any other device configured to transmit on a MIMO-OFDM wireless network.

Receiver 404 is configured to receive radio frequency signals transmitted by MIMO-OFDM transmitter 402. In the exemplary embodiment, receiver 404 is a MIMO-OFDM receiver, but an OFDM receiver may be configured to receive transmissions from MIMO-OFDM transmitter 402 in other embodiments. MIMO-OFDM receiver 404 may, in general, be a fixed or portable wireless device, a cellular phone, a personal digital assistant, a wireless modem card, or any other device configured to receive MIMO-OFDM transmissions. MIMO-OFDM receiver 404 includes one or more antennas 410 for receiving transmitted radio frequency signals. As the sub-carriers traverse channel 408, between transmitter 402 and receiver 404, the sub-carriers are subjected to a variety of noise emissions, for example, thermal noise and noise from man-made sources such as other radio systems and devices emanating spurious signals. Receiver circuitry of receiver 404 also adds noise to the received sub-carrier signals. Embodiments of the receiver 404 estimate the noise variance of received signals for a variety of reasons, for example, use in minimum means squared equalization ("MMSE").

Receiver 404 comprises a noise variance estimator 412 in accordance with embodiments of the invention. Noise variance estimator 412 computes noise variance using noise samples generated by subtracting a first instance of a plurality of related symbols transmitted in a packet preamble from a second instance of the symbol. Noise variance 416 is supplied to channel estimator 414 in order to improve channel transfer function estimation. Embodiments of the invention use the noise variance estimate 416 to improve a variety of processes, for example, log likelihood ratio computation or MMSE equalization. The noise variance estimation may also be used by a scaler that scales the channel outputs such that they have equal or nearly equal noise variances as disclosed in U.S. provisional patent application Ser. No. 60/887,239, filed Jan. 30, 2007, and entitled "Scaling to Equate Noise" hereby incorporated herein by reference.

Figure 5A:
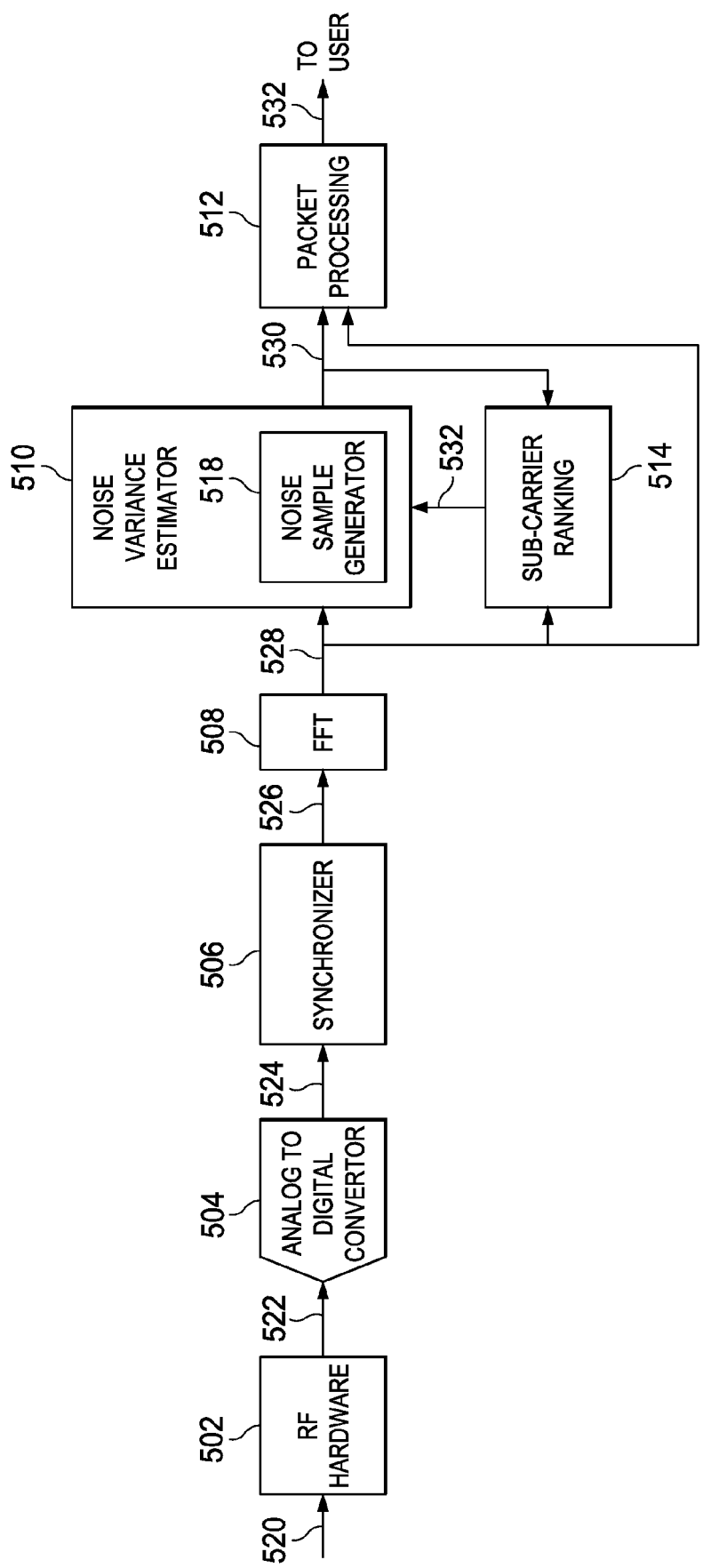
FIG. 5A shows an illustrative block diagram for a receiver including noise variance estimation in accordance with embodiments of the invention.

FIG. 5A shows an illustrative block diagram for a receiver including noise variance estimation in accordance with embodiments of the invention. Radio frequency ("RF") hardware 502 receives radio frequency signals 520 detected by an antenna. The radio frequency signals 520 are down converted to baseband and the baseband signals 522 are provided to analog-to-digital converter 504 for digitization.

Synchronizer block 506 detects OFDM packets in the digitized baseband signal stream 524. The synchronizer 506 may also apply time, frequency, and/or phase corrections to account for changes in these estimated parameters between OFDM symbols. Guard intervals are removed and the time domain OFDM signals 526 are demodulated by the Fourier transformer 508. The demodulated OFDM packets 528 are provided to the noise variance estimator 510. The noise variance estimator 510 comprises a noise sample generator 518 that extracts a pair of identical symbols (or related symbols converted to appear as though identical at transmission) from the preamble of the demodulated OFDM packet 528, and subtracts one symbol from the other in accordance with Equation (1), (2). The result of the subtraction of the two symbols is a set of noise samples. This set of noise samples is used to compute a noise variance 530.

A sub-carrier ranking module 514 ranks the sub-carriers for weighted inclusion in the noise variance computation. The sub-carriers are weighted to reduce inaccuracies in the estimated noise variance. For example, sub-carriers subject to interference or otherwise deemed unsuitable for inclusion in the noise variance estimate may be weighted such that those sub-carriers contribute little or nothing to the estimated noise variance (i.e. better sub-carriers are given higher weights and worse sub-carriers are given lower weights). Embodiments of the sub-carrier ranking module 514 may use a variety of means to determine the suitability of a sub-carrier for inclusion in a noise variance estimate, including deviation of a sub-carrier noise variance 530 from a mean noise variance. Also, an interference estimator in the receiver may provide an estimation regarding whether or not a sub-carrier includes interference. Sub-carrier ranking module 514 may take such input into account by excluding corrupted sub-carriers from the noise-variance computation. Information regarding sub-carrier status 532 is provided to the noise variance estimator 510 for use in noise variance computation in accordance with Equation (4). The estimated noise variance 530 is provided to the packet processing block 512 for use in symbol detection and decoding, channel estimation, and other packet processing.

Figure 5B:
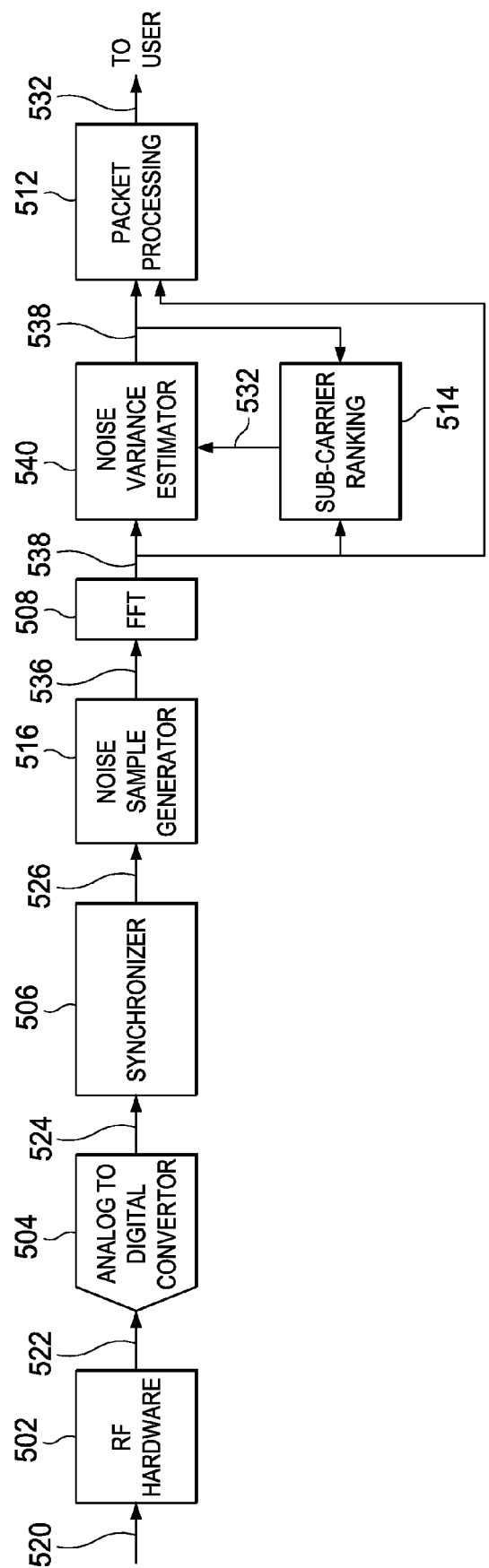
FIG. 5B shows an illustrative block diagram for an alternative receiver embodiment including noise variance estimation in accordance with embodiments of the invention.

FIG. 5B shows an illustrative block diagram for an alternative receiver embodiment including noise variance estimation in accordance with embodiments of the invention. The receiver of FIG. 5B differs from the receiver of FIG. 5A in that the noise sample generator 516 produces time domain noise samples rather than frequency domain noise samples as produced by noise sample generator 518. Noise sample generator 516 extracts a pair of identical symbols (or related symbols converted to appear as though identical at transmission) from the preamble of the OFDM packet 526, and subtracts one symbol from the other to produce a set of noise samples for use in noise variance estimation.

The OFDM packet and the time domain noise samples 536 are transformed into the frequency domain by Fourier transformer 508. The frequency domain samples 538 comprise the demodulated OFDM packet and the frequency domain noise samples. The noise variance estimator 540 produces a noise variance using the frequency domain noise samples and sub-carrier status information 532 as described above.

In some embodiments, the noise sample generator 516, 518 generates noise samples using values known to be transmitted on a sub-carrier, such as pilot sub-carrier values and/or using estimates of values transmitted on a sub-carrier (e.g., using the SIG symbol). Some embodiments of the noise variance estimator 510, 540 produce refined noise variance estimates from previously computed noise variance estimates.

Embodiments of the invention may partition noise variance estimation between time and frequency domains in a variety of ways. For example, embodiments of the invention produce noise samples by subtracting a first time domain multi-sample symbol from a second time-domain multi-sample symbol, or by subtracting a first frequency domain multi-sample symbol from a second frequency domain multi-sample symbol. The present disclosure encompasses all embodiments generating noise variance estimates from related or identical symbols and/or known symbols and/or estimated symbols transmitted in a packet without regard to the partitioning of the estimation between time and frequency domains.

Figure 6:
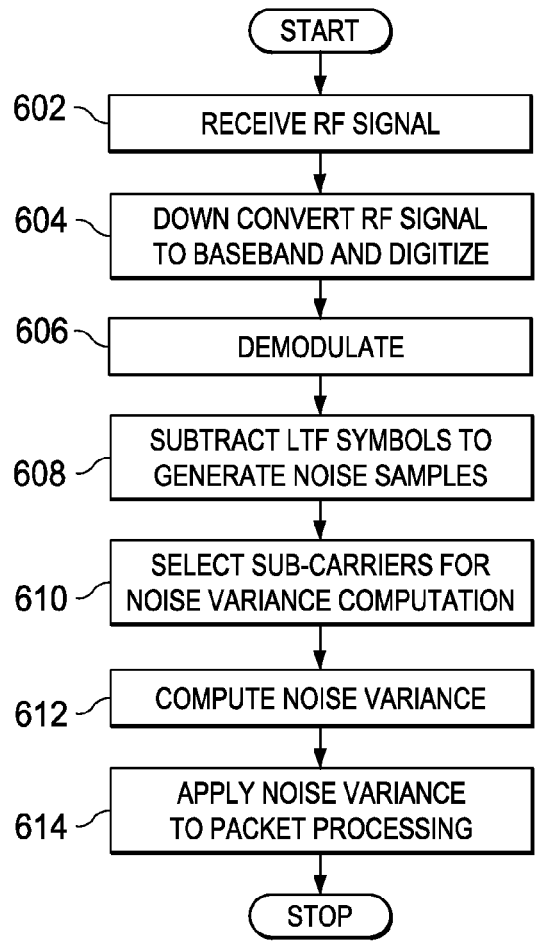
FIG. 6 shows a flow diagram for an illustrative method for estimating noise variance in accordance with embodiments of the invention.

FIG. 6 shows a flow diagram for an illustrative method for estimating noise variance in accordance with embodiments of the invention. Though depicted sequentially as a matter of convenience, at least some of the actions shown can be performed in a different order and/or performed in parallel. In block 602, RF signals are received. The received RF signals are downconverted to baseband and digitized in block 604. In block 606 the digitized baseband signals are demodulated. The guard intervals are stripped from each packet and a Fourier transform is applied to produce frequency domain data as part of OFDM demodulation.

In block 608, noise samples are generated. The LTF field of the IEEE 802.11 preamble comprises two related multi-sample symbols. After extracting two identical symbols from these related symbols, one symbol is subtracted from the other leaving only noise. These noise samples are used to compute the noise variance for the receiver chain. In some embodiments, noise samples are generated prior to frequency domain transformation, and the time domain noise samples are converted to frequency domain samples for use in noise variance estimation.

The sub-carriers whose noise samples will be used to produce the noise variance estimate are selected in block 610. Use of contaminated sub-carriers may result in inaccurate noise variance estimation. Therefore, the sub-carriers used to compute the noise variance are weighted in accordance with their reliability. In some embodiments, unity weighting is used to simplify noise variance estimation. In block 612, the weighted sub-carriers are used to compute the receiver chain noise variance in accordance with Equation (4) above.

In block 614, the noise variance estimate is applied to improve further packet processing, such as channel estimation and LLR generation.

While illustrative embodiments of this invention have been shown and described, modifications thereof can be made by one skilled in the art without departing from the spirit or teaching of this invention. The embodiments described herein are illustrative and are not limiting. Many variations and modifications of the methods and apparatus are possible and are within the scope of the invention. For example, while embodiments of the invention have described in reference to IEEE 802.11, embodiments of the invention encompass any communications system, whether wireless, wired, optical, etc., that transmits two related symbols in a transmission preamble. Accordingly, the scope of protection is not limited to the embodiments described herein, but is only limited by the claims which follow, the scope of which shall include all equivalents of the subject matter of the claims.

What is claimed is:

1. A method for noise variance estimation in an OFDM system comprising:
    receiving a first multi-sample symbol (t−1);
    receiving a second multi-sample symbol (t);
    converting at least one of the first received multi-sample symbol and the second received multi-sample symbol to give the symbols identical transmission values;
    subtracting the first multi-sample symbol from the second multi-sample symbol to produce a set of noise samples $\hat{n}$ using:

$$\hat{n}_{k,i}(t) = \frac{a_k^*(t)}{|a_k(t)|^2} * r_{k,i}(t) - \frac{a_k^*(t-1)}{|a_k(t-1)|^2} r_{k,i}(t-1),$$

where i is the receive chain, and k is subcarrier;
    estimating a noise variance from the set of noise samples; and
    applying the noise variance estimate to process data provided to a user.

2. The method of claim 1, further comprising extracting the first received multi-sample symbol and the second received multi-sample symbol from a long training field ("LTF") of an IEEE 802.11 preamble.

3. The method of claim 1, further comprising extracting the first received multi-sample symbol and the second received multi-sample symbol from an LTF selected from a group consisting of a high-throughput LTF of an IEEE 802.11n Green-Field packet preamble, a legacy LTF of an IEEE 802.11a packet preamble, a legacy LTF of an IEEE 802.11g packet preamble, and a legacy LTF of an IEEE 802.11n mixed-mode packet preamble.

4. The method of claim 1, further comprising:
    producing a set of noise samples for each sub-carrier of a plurality of received sub-carriers to which a long training field ("LTF") is assigned; and
    estimating a noise variance from the set of noise samples produced for each of the plurality of sub-carriers.

5. The method of claim 4, further comprising:
    determining the type of packet received; and
    determining the number of sub-carriers to which the LTF is assigned in the received packet based at least in part on the type of packet received.

6. The method of claim 4, further comprising:
    determining the suitability of each received sub-carrier for inclusion in the noise variance estimation; and
    weighting the noise samples of each received sub-carrier in accordance with the determined suitability of the sub-carrier for inclusion in the noise variance estimation.

7. The method of claim 6, further comprising assigning a low weight to noise samples of each sub-carrier determined unsuitable for inclusion in the noise variance estimation, whereby the weighted noise samples contribute little to the noise variance estimation.

8. A receiver, comprising:
    a noise variance estimator that estimates a noise variance using a set of noise samples; and
    a noise sample generator that extracts a first multi-sample symbol and a second multi-sample symbol from a received packet; the noise sample generator converts at least one of the first multi-sample symbol and the second multi-sample symbol to produce symbols having identical transmission values; and wherein the noise sample generator subtracts the first multi-sample symbol from the second multi-sample symbol to produce the set of noise samples n̂ using:

$$\hat{n}_{k,i}(t) = \frac{a_k^*(t)}{|a_k(t)|^2} * r_{k,i}(t) - \frac{a_k^*(t-1)}{|a_k(t-1)|^2} r_{k,i}(t-1),$$

where i is the receive chain, and k is subcarrier.

9. The receiver of claim 8, further comprising a Fourier transformer coupled to the noise sample generator, the Fourier transformer transforms the set of noise samples from the time domain to the frequency domain if the noise sample generator produces a set of time domain noise samples, and transforms the first multi-sample symbol and the second multi-sample symbol from the time domain to the frequency domain if the noise sample generator produces a set of frequency domain noise samples.

10. The receiver of claim 8, wherein the noise sample generator produces a set of noise samples for a sub-carrier by taking the difference between a first symbol and a second symbol, the first symbol generated by removing a first known transmitted value from a first received symbol and the second symbol generated by removing a second known transmitted value from a second received symbol when the first received multi-sample symbol and the second received multi-sample symbol do not have a same deterministic content.

11. The receiver of claim 8, wherein the noise sample generator estimating deterministic components by producing a set of noise samples for a sub-carrier by taking the difference between a first symbol and a second symbol, the first symbol generated by removing a first estimated transmitted value from a first received symbol and the second symbol generated by removing a second estimated transmitted value from a second received symbol.

12. The receiver of claim 8, wherein the noise variance estimator produces a refined noise variance estimate from a set of previously computed noise variance estimates.

13. The receiver of claim 8, wherein the noise variance estimator produces a noise variance estimate from a set of noise samples comprising noise samples used to produce a previous noise variance estimate.

14. The receiver of claim 8, further comprising a sub-carrier ranking module that determines the suitability of a received sub-carrier's noise samples for inclusion in the noise variance estimation.

15. The receiver of claim 14, wherein the sub-carrier ranking module determines the suitability of a received sub-carrier for inclusion in noise variance estimation at least in part by comparing a noise variance previously computed for the sub-carrier against noise variances computed for other sub-carriers.

16. The receiver of claim 14, further comprising:
a channel transfer function estimator that estimates a channel response, the channel transfer function estimator is coupled to the noise variance estimator; and wherein the noise variance estimator computes an estimated noise variance without using the channel response.

17. The receiver of claim 14, wherein the noise variance estimator assigns a weight to the sub-carrier's noise samples in accordance with the sub-carrier's suitability for inclusion in noise variance estimation.

18. The receiver of claim 8, wherein the noise variance estimator:
determines the type of packet received;
determines the number of sub-carriers assigned to a pair of symbols transmitted in the packet;
produces a set of noise samples for each sub-carrier of a plurality of sub-carriers assigned to the pair of symbols; and
estimates a noise variance using the sets of noise samples produced for the plurality of sub-carriers assigned to the pair of symbols.

19. The receiver of claim 8, wherein the receiver is an IEEE 802.11n receiver.

20. A system, comprising:
a transmitter that transmits a packet comprising at least two multi-sample symbols; and
a receiver that receives the transmitted packet, the receiver comprising a noise variance estimator and a noise sample generator;
wherein the noise sample generator extracts the at least two symbols from the received packet, converts at least one of the first multi-sample symbol and the second multi-sample symbol to produce symbols having identical transmission values, and subtracts one symbol from the other to produce a set of noise samples n̂ using:

$$\hat{n}_{k,i}(t) = \frac{a_k^*(t)}{|a_k(t)|^2} * r_{k,i}(t) - \frac{a_k^*(t-1)}{|a_k(t-1)|^2} r_{k,i}(t-1),$$

where i is the receive chain, and k is subcarrier: and
wherein the noise variance estimator uses the set of noise samples to estimate a noise variance.

21. The system of claim 20, wherein the system is a Multiple Input Multiple Output Orthogonal Frequency Division Multiplexing system.

22. The system of claim 20, wherein the noise sample generator produces a set noise samples for each sub-carrier of a plurality of received sub-carriers and the noise variance estimator estimates a noise variance from the set of noise samples produced for each of the plurality of sub-carriers.

23. The system of claim 20, wherein the receiver determines the suitability of each sub-carrier for inclusion in noise variance estimation and weights the set of noise samples produced for each sub-carrier to reduce the effect on the noise variance estimation of noise samples of sub-carriers deemed unsuitable for inclusion in the noise variance estimation.

* * * * *